United States Patent
Pan et al.

(10) Patent No.: US 8,028,643 B2
(45) Date of Patent: Oct. 4, 2011

(54) ALL-DIRECTIONAL FALL SENSOR

(75) Inventors: Sheau-Shi Pan, Hsinchu (TW); Feng-Yu Yang, Hsinchu (TW); Fu-Lung Pan, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 387 days.

(21) Appl. No.: 12/385,323

(22) Filed: Apr. 6, 2009

(65) Prior Publication Data

US 2010/0253530 A1    Oct. 7, 2010

(30) Foreign Application Priority Data

Apr. 9, 2008   (TW) ............................... 97112789 A

(51) Int. Cl.
*G01L 5/00*   (2006.01)
(52) U.S. Cl. ........ 116/203; 116/200; 116/205; 340/665; 340/669; 346/7
(58) Field of Classification Search .................. 340/665, 340/669; 116/200–205; 346/7; 73/652
See application file for complete search history.

(56) References Cited

U.S. PATENT DOCUMENTS

| | | | | |
|---|---|---|---|---|
| 4,125,085 A | * | 11/1978 | Rubey | 116/203 |
| 4,943,690 A | * | 7/1990 | Bitko | 200/61.47 |
| 5,378,865 A | * | 1/1995 | Reneau | 200/61.45 R |
| 5,575,479 A | | 11/1996 | Ayres | |
| 5,970,794 A | | 10/1999 | Yoshida | |
| 5,983,724 A | | 11/1999 | Yoshida | |
| 6,698,272 B1 | * | 3/2004 | Almirante | 73/12.01 |
| 7,219,619 B2 | * | 5/2007 | Fitzer et al. | 116/203 |
| 7,603,961 B2 | * | 10/2009 | Mayenschein et al. | 116/215 |
| 2007/0194943 A1 | * | 8/2007 | Fitzer et al. | 340/686.1 |
| 2008/0217144 A1 | * | 9/2008 | Honer et al. | 200/61.47 |
| 2010/0188243 A1 | * | 7/2010 | Tysowski et al. | 340/669 |

FOREIGN PATENT DOCUMENTS

| CN | 2656978 Y | | 11/2004 |
|---|---|---|---|
| JP | 2001083173 A | * | 3/2001 |
| JP | 2001099854 A | * | 4/2001 |
| TW | 1255342 | | 5/2006 |

* cited by examiner

*Primary Examiner* — Eric M Blount
(74) *Attorney, Agent, or Firm* — Bacon & Thomas, PLLC

(57) ABSTRACT

The all-directional fall sensor of the present invention includes a first casing defining a first interior space filled with a liquid and a floater buoyed by the liquid inside the first casing. The floater includes an indicator having indicative materials therein. The indicator includes a body defining a chamber, which is divided into at least a first portion and a second portion with a first sealing member located therebetween. The indicative materials are contained in the second portion of the chamber and are sealed therein with the first sealing member. When the all-directional fall sensor is applied with a force, the first sealing member would be dislocated and thus the indicative materials are dispersed within the chamber.

19 Claims, 4 Drawing Sheets

ALL-DIRECTIONAL FALL SENSOR

BACKGROUND OF THE INVENTION

1. Field of the Invention

The present invention relates to a fall sensor, especially to an all-directional fall sensor capable of detecting whether a product has suffered a fall or an impact 2. Description of the Related Art Under the market demand for compact multi-functional electronics with cool design, how to prevent damages to the electronic products caused by accidental dropping is an important aspect to the design of the products. Such prevention is one of the value-added design aspects in the mechanical designs of products. Through experiments and simulations, the mechanical design is amended and shock-absorption materials are added to satisfy the specification requirement for preventing damages due to a drop. However, if during transport or within warranty a product is dropped and broken, and there is no damage readily apparent on the appearance, the maker in this case may have to bear the responsibility for fixing the product.

A buyer of a PDA or a cell phone may sometimes find the PDA or cell phone not functioning after coming home and opening the box containing the PDA or cell phone. It is usually very difficult to determine if the PDA or cell phone has suffered a fall. Sensors are normally used to determine whether the PDA or cell phone has suffered a fall or an external impact. There are a variety of sensors available, such as a capacitance sensor, a suspension spring sensor, a magnetic induction current sensor, a mass-acceleration sensor, a magnetoresistive sensor, a spring mass sensor, a piezoelectric sensor, and a fluid sensor.

U.S. Pat. No. 5,970,794 discloses a shock sensor utilizing a coil that produces a magnetic field. The magnetic field changes when there is a shock and the sensor outputs an induced electric current.

U.S. Pat. No. 5,983,724 discloses a shock sensor that contains a magnetic shock-sensing member rotatably disposed in the sensor. When there is shock, the magnetic shock-sensing member rotates and outputs a signal caused by a magnetoresistive effect.

U.S. Pat. No. 5,575,479 discloses a projectile impact indicating target. When the projectile is hit, an impact indicator is released from the projectile.

Taiwan Patent No. I 255342 discloses a shock sensor comprising a spring plate apparatus disposed inside a cell phone. The spring plate apparatus comprises two spring plates that are connected together and have electrical currents passing through. When the cell phone suffers a fall or an impact, one of the spring plates disconnects with the other and turns off the electrical current.

Shock Watch Company produces a shock indicator model no. MAG2000. The shock indicator is for placing on the container used for transporting products or machines. The indicator is basically a casing with two rooms. A magnet is placed in the center of one room, and a magnetic material is movably placed in another room. The impact direction and the magnetic field line generated between the magnet and the magnetic material are perpendicular. The magnetic material is attracted to the magnet, and when the indicator suffers a drop or an impact, the magnetic material moves towards the direction of the impact or fall; whether the container has suffered a fall or an impact can thus be determined.

SUMMARY OF THE INVENTION

It is an aspect of the present invention to provide an all-directional fall sensor to detect a fall or impact of an electronic product. The all-directional fall sensor arranged inside the electronic product includes a floater and an sealing member, wherein the gravity of sealing member follows a direction parallel to the magnetic force of the same due to the location of center of gravity of the floater. By means of the present invention, the magnetic force of sealing member, the acceleration of gravity generated from fall of the product, the inertia and the impact force may cause a status variation of the sealing member, so as to determine that if a fall of the product occurs in use.

It is another aspect of the present invention to provide a sensor for check the use status of an electronic consumable. The sensor of the present invention is arranged upon an electronic product, so as to determine if the product has ever fallen in use, and thereby the responsibility of consumers and of manufacturers is distinguishable.

In accordance with the mentioned aspects, the provided all-directional fall sensor includes a first casing defining a first interior space filled with a liquid; and a floater buoyed by the liquid inside the first casing, where the floater includes an indicator having indicative materials therein. The indicative materials are dispersed inside the indicator in case of the all-directional fall sensor being applied with an impact force.

It is still a further aspect of the present invention to provide a sensing method for all-directional fall of an object. The sensing method includes steps of attaching an all-directional fall sensor to the object wherein the all directional fall sensor includes a chamber having at least a first portion and a second portion with a sealing member disposed therebetween and indicative materials filled within the first portion of the chamber, the sealing member dislocating while the object is subjected to an external force, and fluidly connecting the first and second portions of the chamber such that the indicative materials disperse within the first and second portions of the chamber to show a user that the object is subjected to the external force.

BRIEF DESCRIPTION OF THE DRAWINGS

The above objects and advantages of the present invention will become more readily apparent to those ordinarily skilled in the art after reviewing the following detailed descriptions and accompanying drawings, in which.

DETAILED DESCRIPTION OF THE EMBODIMENT

The present invention will now be described more specifically with reference to the following embodiments. It is to be noted that the following descriptions of embodiments of this invention are presented herein for purpose of illustration and description only; it is not intended to be exhaustive or to be limited to the precise form disclosed.

Figure 1:
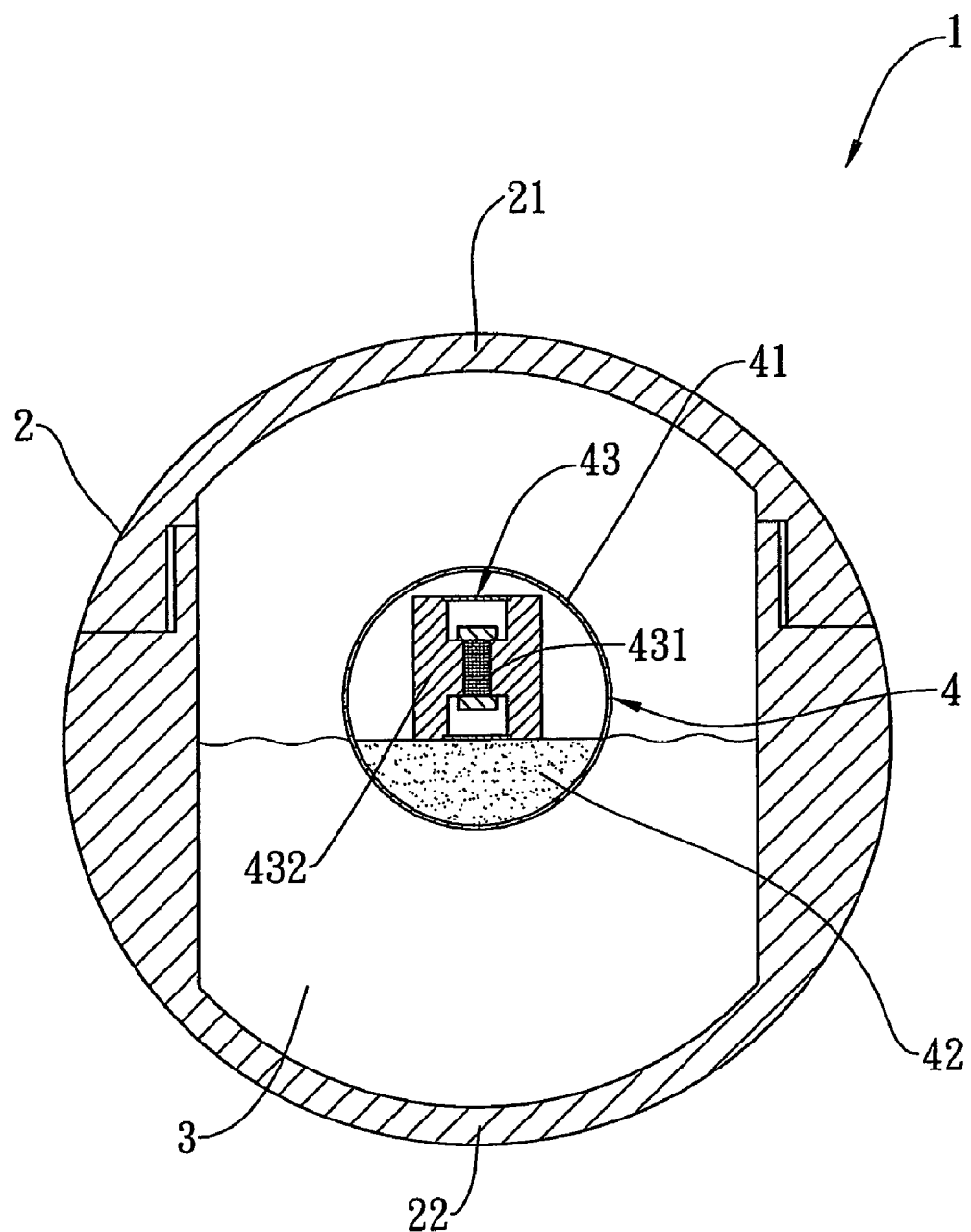
FIG. 1 is a cross-sectional view of an all-directional fall sensor in accordance with the first embodiment of the present invention.
Figure 2:
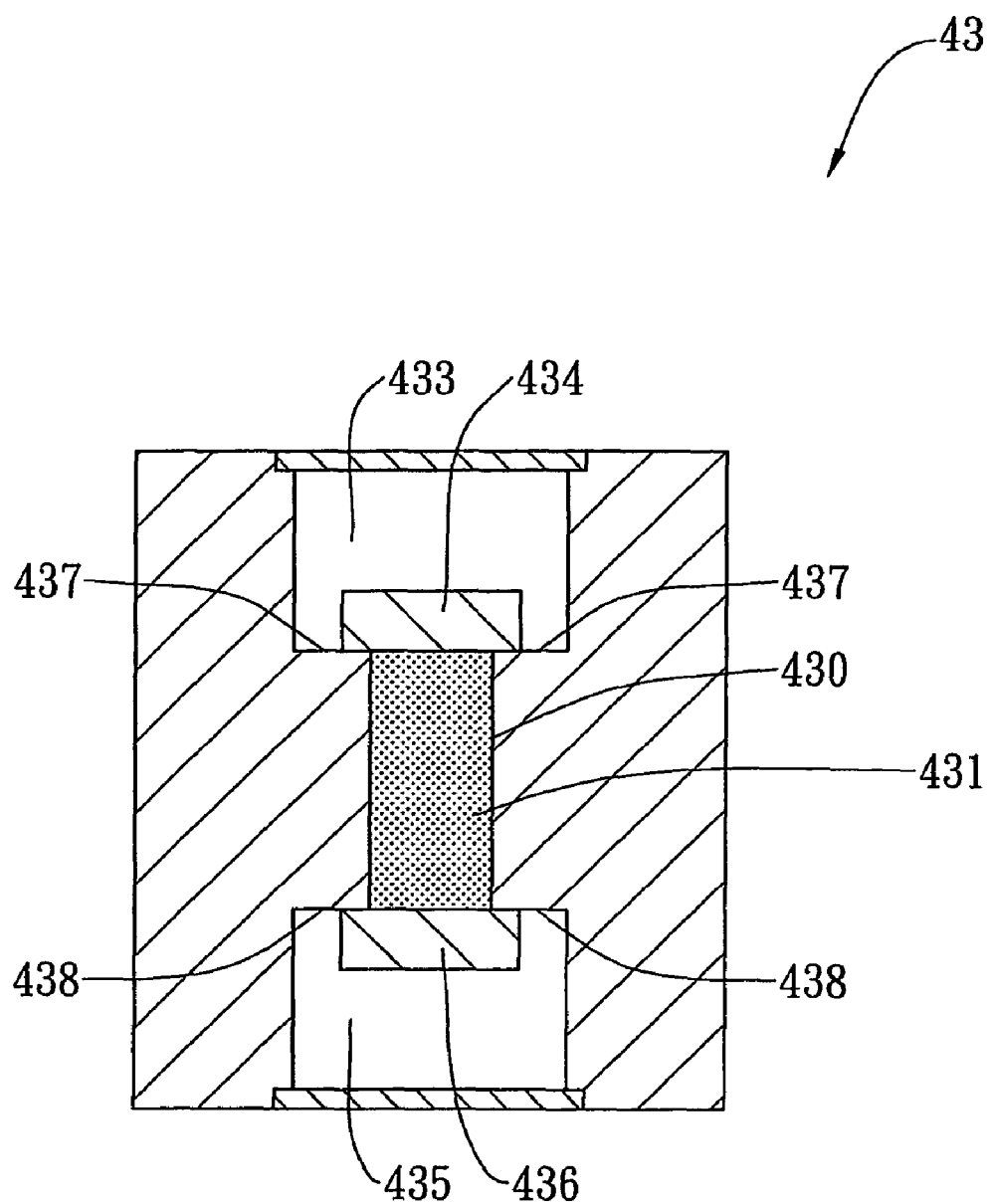
FIG. 2 is a cross-sectional view of the indicator of the all-directional fall sensor according to the present invention.
Figure 3:
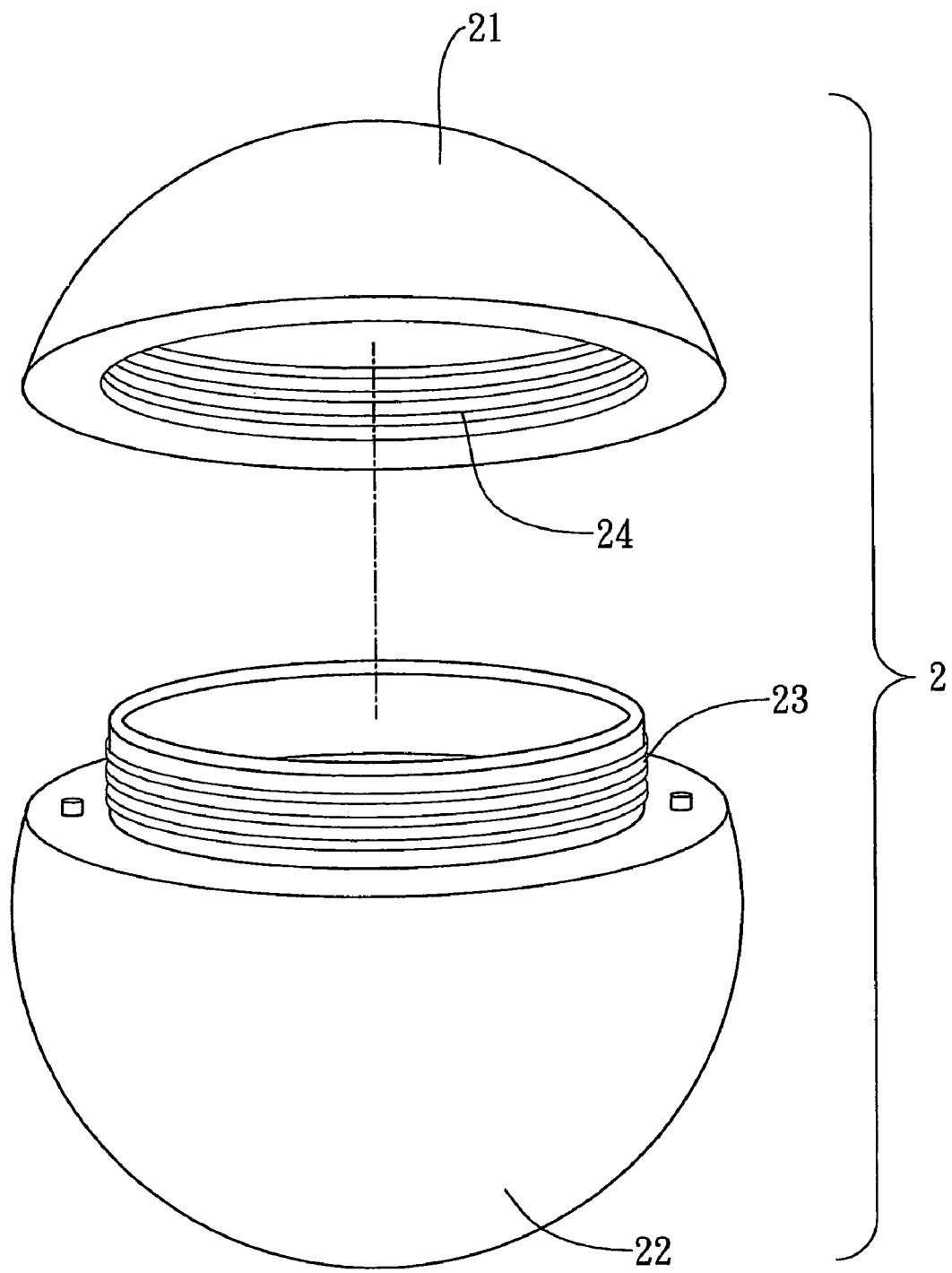
FIG. 3 shows a stereo view of the first casing of the all-directional fall sensor according to the present invention.

FIGS. 1, 2 and 3 respectively show a cross-sectional view of an all-directional fall sensor, the indicator of the all-directional fall sensor and the first casing of the all-directional fall sensor in accordance with the first embodiment of the present invention. The all-directional fall sensor 1 of the present invention includes a sphere-shaped first casing 2 which is hollow and filled with a liquid 3, and includes a sphere-shaped floater 4 which is buoyed by the liquid 3 inside the first casing 2. The floater 4 includes an indicator 43 having indicative materials 431 therein. The indicative materials 431 may be dispersed inside the indicator 43 when the all-directional fall sensor 1 experiences an impact force. The first casing 2 defines a space for containing the liquid 3 therein. In this embodiment, the liquid 3 is water, while the use of any other fluid is possible. The first casing 2 includes an upper casing 21 with female threads 24 and a lower casing 22 with male threads 23, so that the upper casing 21 and the lower casing 22 can be screwed together. The indicative materials 431 may be fluorescent powders or colored grains, which are easier to observe by an observer.

The floater 4 is constructed by a hollow second casing 41 and a mass 42. The second casing 41 defines a second interior space while the mass 42 is located at a lower portion of the second interior space, and the indicator 43 is located on the mass 42. In this case, the respective centers of gravity of the indicator 43 and the mass 42 lay in parallel or concentric directions. For observing whether the indicative materials 431 are dispersed within the chamber 432 of indicator 43, the second casing 41 is made of transparent plastic material. The chamber 432 defined by a body is divided into a first portion 433 and a second portion 430 with a first sealing member 434 located therebetween, so that the indicative materials 431 are contained in the second portion 430 of the chamber 432 and are sealed therein with the first sealing member 434, and are dispersed within the chamber 432, including the first portion 433 and the second portion 430, since the first sealing member 434 is dislocated when the all-directional fall sensor 1 experiences an impact force. The chamber 432 further includes a second sealing member 436 which divides the chamber 432 as the second portion 430 and a third portion 435, so that the indicative materials 431 are contained in the second portion 430 of the chamber 432 and are sealed therein with the first sealing member 434 and the second sealing member 436. As such, the sensor of the present invention functions for detecting external forces from different directions. Once the indicator 43 has experienced an external force, the indicative materials 431 are scattered and dispersed within the chamber 432, which is observable from outside due to the transparent second casing 41. The axial direction of the body defining the chamber 432 is the same as with the gravity direction of the mass 42.

In accordance with the first embodiment of the present invention, the chamber 432 includes the first portion 433 and the third portion 435 at the upper side and lower side thereof respectively. The body defining the chamber 432 includes a first shoulder 437 formed on an inner face thereof, so that the first sealing member 434 abuts against the first shoulder 437 to seal the indicative materials 431 within the second portion 430 of the chamber 432. Also, the body defining the chamber 432 includes a second shoulder 438 formed on an inner face thereof, so that the second sealing member 436 abuts against the second shoulder 438 to seal the indicative materials 431 within the second portion 430 of the chamber 432. There are several ways to get the first sealing member 434 and the second sealing member 436 to attract each other or be attracted to surrounding structures. The material of respective first sealing member 434 and second sealing member 436 are selectable for achieving such attraction. For instances, the first sealing member 434 and the second sealing member 436 are both made of magnetic materials. Alternatively, the first sealing member 434 is made of magnetic material and the second sealing member 436 is made of metallic material such as iron, copper or nickel. The body defining the chamber 432 is made of plastic, metallic, or magnetic material. When the body is made of magnetic material, the first sealing member 434 and the second sealing member 436 are made of metallic material. When the all-directional fall sensor 1 of the present invention is installed in an electronic product, the center of gravity of the floater 4 is lowered due to the location of mass 42 and the direction of magnetic force caused by the second sealing member 436 is parallel to the direction of gravity due to the weight of the mass 42. When such a product suffers a drop, the drop is observed when the second sealing member 436 detaches as a result of interactions of free-fall, inertia, and impact. When the drop happened, the second sealing member 436 is detached from the second shoulder 438, and the indicative materials 431 are scattered and dispersed inside the chamber 432.

Figure 4:
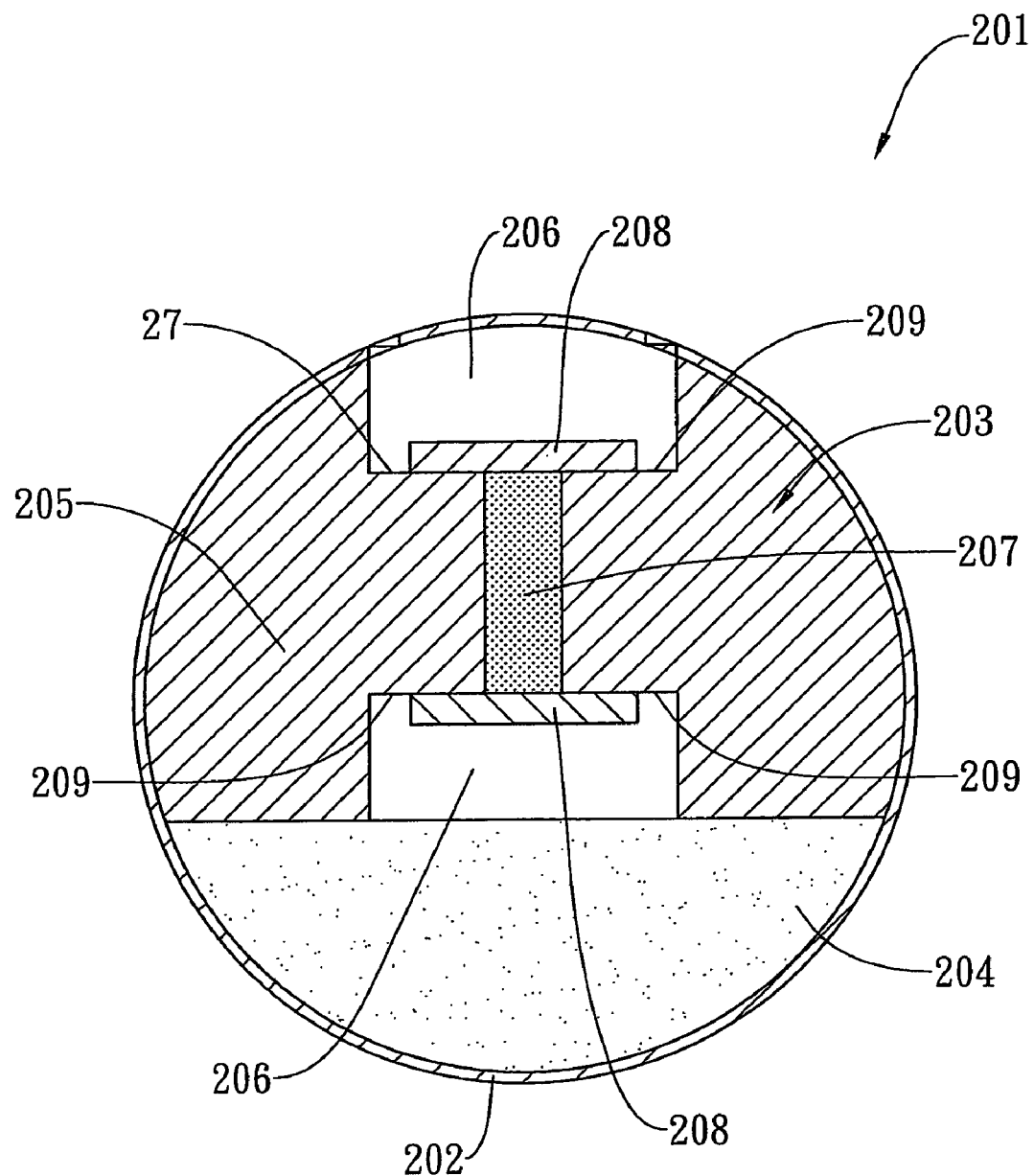
FIG. 4 is a schematic view of an all-directional fall sensor in accordance with the second embodiment of the present invention.

FIG. 4 shows a schematic view of an all-directional fall sensor in accordance with the second embodiment of the present invention. The all-directional fall sensor of the present invention includes a floater 201 which is mainly constructed by a casing 202, an indicator 203 and a mass 204. The casing 202 defines an interior space thereof where the mass 204 is located in the bottom portion of the interior space and the indicator 203 is located on top of the mass 204. Both the mass 204 and the indicator 203 are located inside the casing 202. The center of gravity of the floater 201 is relatively low due to the location of the mass 204. The indicator 203 is constructed by a body defining a chamber 205. In this embodiment, the chamber 205 includes at least one portion 206 and at least one indicative material 207 filled therein. The indicative material 207 is contained in the portion 206 and sealed therein with at least one first sealing member 208, which is disposed inside the chamber 205.

In this embodiment, the portion 206 of the chamber 205 has a first shoulder 209 formed on the interior face thereof, and the first sealing member 208 is attachable to the shoulder 209 so as to seal the portion 206. Regarding the first embodiment of the present invention, the indicator 43 is separately provided on the mass 42 inside the first casing 2 of the sensor 1, while in the second embodiment, the indicator 203 is also constructed by the casing 202 of the floater 201. In more specifics, the chamber 205 defined by the body of indicator 203 occupies the most interior space defined by the casing 202, except the occupying of mass 204. As to the remaining features, there is no substantial difference existing between the two embodiments, and thus are not repeatedly illustrated herein.

The present invention also provides a sensing method for all-directional fall of an object. In this case, the object, for example an electronic product such as the PDA or cell phone, is provided with an all-directional fall sensor, e.g. an all-directional fall sensor according to the present invention. As shown in either one of FIGS. 1-4, the all-directional fall sensor including a chamber and indicative materials contained therein is attached onto the object. The chamber is divided into at least two portions, i.e. a first portion and a second portion, with a sealing element disposed therebetween in such a way that the indicative materials are originally contained in the first portion of the chamber. When the object is subjected to an external force and thus a move thereof is produced, the sensor attached thereon may suffer a force as well so that the sealing element disposed between the two portions of the chamber is dislocated. Due to the dislocation of sealing element, the two portions of the chamber are fluidly connected to each other and then the indicative materials disperse within the entire chamber, including the first and the second portion. The user and/or buyer of an object may be clearly aware that such object is subjected to an external force, or even a fall, if the indicative materials, e.g. fluorescent powders or color grains, disperse within the entire chamber.

Through the present invention, the indicative materials originally confined within a first portion of chamber of the sensor are scattered and dispersed within the whole chamber while the sealing element thereof is dislocated and detached due to the suffering of external force. Consequently, it becomes so easy to identify if an electronic product attached with such sensor is ever subjected to an external force or even a fall.

While the embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

While the invention has been described in terms of what are presently considered to be the most practical and embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. An all-directional fall sensor, comprising:
    a first casing defining a first interior space filled with a liquid; and
    a floater buoyed by said liquid inside said first casing, said floater including an indicator having indicative materials therein,
    wherein said indicative materials are dispersed inside said indicator in case of said all-directional fall sensor being applied with a force.

2. The all-directional fall sensor of claim 1, wherein said first casing comprises an upper casing with female threads and a lower casing with male threads so that said upper casing and said lower casing are screwed together.

3. The all-directional fall sensor of claim 1, wherein said liquid is water.

4. The all-directional fall sensor of claim 1, wherein said floater comprises a second casing defining a second interior space and a mass disposed at a lower portion of said second interior space, and said indicator is located on said mass.

5. The all-directional fall sensor of claim 4, wherein said indicator comprises a body defining a chamber, said chamber being divided into at least a first portion and a second portion with a first sealing member located therebetween so that said indicative materials are contained in said second portion of said chamber and are sealed therein with said first sealing member, and are dispersed within said chamber in case of said first sealing member being dislocated when said all-directional fall sensor is applied with a force.

6. The all-directional fall sensor of claim 5, wherein said chamber is divided into said first portion, said second portion and a third portion with said first sealing member located between said first portion and said second portion and a second sealing member located between said second portion and said third portion, so that said indicative materials are contained in said second portion of said chamber and are sealed therein with said first sealing member and said second sealing member.

7. The all-directional fall sensor of claim 4, wherein said second casing is made of a transparent plastic material.

8. The all-directional fall sensor of claim 1, wherein said indicative materials comprises fluorescent powders.

9. The all-directional fall sensor of claim 1, wherein said indicative materials comprises color grains.

10. The all-directional fall sensor of claim 5, wherein said body comprises a first shoulder formed on an inner face thereof, and said first sealing member abuts against said first shoulder to seal said indicative materials within said first portion of said chamber.

11. The all-directional fall sensor of claim 6, wherein said body comprises a second shoulder formed on an inner face thereof, and said second sealing member abuts against said second shoulder to seal said indicative materials within said second portion of said chamber.

12. The all-directional fall sensor of claim 6, wherein said first sealing member and said second sealing member are made of magnetic material.

13. The all-directional fall sensor of claim 6, wherein one of said first sealing member and said second sealing member is made of magnetic material, and the other one thereof is made of metallic material.

14. The all-directional fall sensor of claim 5, wherein said body is made of magnetic material.

15. The all-directional fall sensor of claim 5, wherein said body is made of metallic material.

16. The all-directional fall sensor of claim 6, wherein said body is made of plastic material, and one of said first sealing member and said second sealing member is made of metallic material.

17. The all-directional fall sensor of claim 1, wherein said first casing is sphere-shaped.

18. The all-directional fall sensor of claim 1, wherein said floater is sphere-shaped.

19. A sensing method for all-directional fall of an object, comprising:
    attaching an all-directional fall sensor to said object, said all directional fall sensor including a chamber having at least a first portion and a second portion with a sealing member disposed therebetween and indicative materials filled within said first portion of said chamber;
    said sealing member dislocating while said object is subjected to an external force; and
    fluidly connecting said first and second portions of said chamber such that said indicative materials disperse within said first and second portions of said chamber to show a user that said object is subjected to said external force.

* * * * *